United States Patent [19]

Moser et al.

[11] 4,284,731

[45] Aug. 18, 1981

[54] POLYURETHANE ADHESIVE COMPOSITIONS CONTAINING DICYCLOPENTENYLOXYALKYL (METH) ACRYLATE

[75] Inventors: Vincent J. Moser, Hatboro; Robert A. Slowik, Levittown, both of Pa.

[73] Assignee: Rohm and Haas, Philadelphia, Pa.

[21] Appl. No.: 126,758

[22] Filed: Mar. 3, 1980

[51] Int. Cl.$^3$ ............................................. C08G 18/10
[52] U.S. Cl. .................................... 525/28; 156/272; 156/331.4; 427/385.5; 427/388.1; 428/424.2; 428/425.8; 525/404; 525/411; 525/412; 525/440; 525/454; 525/455; 528/48; 528/50; 528/75
[58] Field of Search .................. 525/28, 404, 411, 412, 525/440, 454, 455; 528/48, 50, 75; 156/272, 331; 427/385.5, 388.1; 428/424.2, 425.8

[56] References Cited

U.S. PATENT DOCUMENTS

| | | | |
|---|---|---|---|
| 3,650,669 | 3/1972 | Osborn et al. | 8/115.5 |
| 3,782,961 | 1/1974 | Takahashi et al. | 204/159.15 |
| 4,082,634 | 4/1978 | Chang | 204/159.15 |
| 4,097,677 | 6/1978 | Emmons et al. | 560/220 |
| 4,178,425 | 12/1979 | Emmons et al. | 528/73 |

FOREIGN PATENT DOCUMENTS 2459419  6/1976  Fed. Rep. of Germany .

OTHER PUBLICATIONS

Iyengar et al., J. App. Polymer Sci., vol. 11, 1967, pp. 2311–2324.

*Primary Examiner*—Maurice J. Welsh

[57] ABSTRACT

This invention is concerned with spreadable fluid adhesive compositions, curable by conventional vinyl free radical polymerization or by exposure to a source of radiation, comprising a urethane prepolymer, at least one of dicyclopentyloxyalkyl acrylate and methacrylate, a polyol, and an effective amount of catalysts for curing of the urethane prepolymer and of the acrylate or methacrylate component. The invention is also concerned with a process for producing laminates of solid materials wherein the solid materials are adhered together by the adhesive composition.

11 Claims, No Drawings

POLYURETHANE ADHESIVE COMPOSITIONS CONTAINING DICYCLOPENTENYLOXYALKYL (METH) ACRYLATE

BACKGROUND OF THE INVENTION

This invention relates to spreadable fluid adhesive compositions, curable by conventional vinyl free radical polymerization processes or by exposure to a source of radiation, comprising a urethane prepolymer, at least one of dicyclopentenyloxyalkyl acrylate and methacrylate, a polyol, and an effective amount of catalysts for curing of the urethane prepolymer and of the acrylate or methacrylate component. This invention is also concerned with a process for producing laminates of solid materials, for example, plastic film and metallic foil, wherein the solid materials are adhered together by the adhesive composition.

The most widely used adhesives for flexible packaging laminations are based on curable, low molecular weight polyether- and polyesterurethanes that are supplied as flammable and/or volatile solvent-borne systems. Common solvents used include methyl ethyl ketone, ethyl acetate, toluene and the like, all of which must be moisture-free to prevent premature reaction of the isocyanate groups of the polyurethane. Usually, plastic film laminates are produced by applying the solvent-borne adhesive to one film, evaporating the solvent from the applied adhesive, contacting a second film with the adhesive-bearing surface of the one film, and allowing the adhesive to cure at ambient conditions. When so used, early adhesive strength, known in the art as "green strength," is due to the high viscosity of the dry but yet uncured polyurethane adhesive. Despite the wide use of such solvent-borne polyurethane adhesives, their use is associated with several disadvantages. Process and performance limitation due to solvent content are encountered; for example, residual solvent may be retained in the final laminate thereby providing a source of odor and contamination, inks, coatings and films may be attacked by residual solvents contained in the adhesive, and elevated temperature required for evaporating the solvent may cause dimensional change in the film which results in built-in stresses in the laminate. Also, increasing solvent costs and uncertain availability are a source of increasing concern. Potential fire hazards due to the flammability of the solvents, and high insurance premiums, force serious examination and change away from solvent-borne adhesives. Still further, pollution, energy conservation, and health and safety concerns detract from the advantages of solvent-borne polyurethane adhesives.

Some improvement in the art has been achieved by the use of a solvent-free 100% reactive adhesive system wherein the solvent is replaced with conventional polymerizable ethylenically unsaturated monomers such as butyl acrylate, and the resulting adhesive composition is subsequently polymerized and cured by exposure to a source of radiation or by use of conventional free radical catalysts. This process eliminates solvent emissions but still suffers from flammability and toxicity problems and has an added difficulty due to shrinkage upon polymerization of the monomer.

Some improvement in the art has also been achieved by the use of a hot-melt adhesive system wherein a 100% solids polyurethane adhesive compound is melted to a coatable viscosity and applied to a film. While the adhesive is still molten, a second film is contacted therewith to form a laminate. The disadvantages associated with this process include the need for an expensive hot-melt applicator, the requirement to exclude moisture prior to application, and the need to supply moisture after application. The latter disadvantage can be eliminated by effecting cure by radiation.

These and other aspects of the known art relating to polyurethane adhesives for making laminates are disclosed in a paper entitled, "In Search Of The Ideal Laminating Adhesive," by Martin M. Grover and Stuart H. Ganslaw, in "Paper, Film and Foil Convertor," November, 1977, page 71.

DESCRIPTION OF THE PRIOR ART

Takahashi et al., U.S. Pat. No. 3,782,961, issued Jan. 1, 1974, discloses a photosensitive composition comprising a polyurethane prepolymer and a photosensitizer, the prepolymer being prepared by the reaction of a hydroxyl component having at least 5 ether linkages and an ethylenically unsaturated double bond positioned at the terminals with a polyisocyanate component, the photosensitive composition being suitable as a material for the production of press printing plates and flexographic printing plates.

Osborn et al., U.S. Pat. No. 3,650,669, issued Mar. 21, 1971, discloses a method for polymerizing, by exposure to light radiation, a composition comprising a polyester urethane containing a norbornenyl group in the polyester and an acrylyl ester wherein the ester group is the dicyclopentenyloxyethyl group, the resulting polymer being useful to produce coatings and laminates.

Chang, U.S. Pat. No. 4,082,634, issued Apr. 4, 1978, discloses a method of producing a cured polyurethane comprising subjecting a layer of a curable polyurethane composition comprising the reaction product of at least one hydroxyl-containing ester having a terminal acrylyl or alpha-substituted acrylyl group, an organic diisocyanate and a polyester polyol, and optionally one or more copolymerizable ethylenic monomers, to ionizing radiation or actinic light sufficient to cure the polyurethane composition. The method is useful to provide films, coatings, impregnated materials, and laminates.

Henke et al., German Offenlegungsschrift No. 2,459,419 dated June 24, 1976, discloses mixtures containing 30-80% of the reaction products of polyisocyanates with polyether or polyester polyols, 70-20% $C_2$–$C_{18}$ alkyl (meth)acrylates, and 0.2-5% photoinitiator as photopolymerizable, solvent-free adhesives for bonding polyolefin laminates.

Y. Iyengar and D. E. Erickson, Journal of Applied Polymer Science, 11, 2311 (1967) disclose the adhesion of 1,4-oxybutylene glycol-toluene diisocyanate polyurethanes to polyester film.

Emmons and Nyi, U.S. Pat. No. 4,097,677, issued June 27, 1978, discloses polymerizable and autoxidizable unsaturated esters of glycol monodicyclopentenyl ethers, particularly dicyclopentenyloxyalkyl methacrylates and acrylates which are referred to generically as dicyclopentenyloxyalkyl (meth)acrylates (DCPOE(M)A). See column 1, line 32 to column 2, line 15. The patent discloses broadly at column 3, lines 12 to 15, the use of the monomers, DCPOE(M)A, as modifiers for polyurethane. At column 3, line 54 to column 4, line 11, the patent broadly discloses the use of photopolymerizable compositions containing DCPOE(M)A as an adhesive. At column 9, line 26 through column 19, line 17, the patent discloses "Polyurethane Coating Compositions" containing as the non-volatile reactive liquid monomer component DCPOE(M)A or a mixture of a predominant proportion thereof with a minor proportion of another non-volatile liquid ester. (See column 10, lines 24 to 46). The polyurethane compositions disclosed in the patent contain (1) a polyisocyanate or isocyanate-modified dry oil, with or without (2) a reactive hydrogen-containing compound and (3) non-volatile liquid reactive monomer comprising at least one of DCPOE(M)A and are curable by autoxidation, that is, curable with a siccative or drier in the presence of air.

Emmons and Nyi, U.S. Pat. No. 4,178,425, a continuation-in-part of the application which issued as U.S. Pat. No. 4,097,677 mentioned above, discloses autoxidizable urethane coating compositions containing a film-forming binder of (1) one of an organic polyisocyanate, a urethane oil or a uralkyd, (2) DCPOE(M)A, and (3) a siccative, and, optionally, (4) an active hydrogen-containing compound.

SUMMARY OF THE INVENTION

It is an object of the invention to provide an improved fluid, 100% active polyurethane adhesive for laminating plastic films and metallic foils.

It is another object of the invention to provide a process for producing an improved laminate of films of solid materials including thermoplastic films and metallic foil films and sheets.

These and other objects as will become apparent are achieved by the present invention which comprises a spreadable fluid adhesive composition comprising, its essential components, (a) from about 30% to about 50% by weight of a urethane polymer derived from the reaction of a member selected from the group consisting a hydroxyl-terminated polyether and a hydroxyl-terminated polyester with an organic polyisocyanate, the urethane prepolymer having a free —NCO content of from about 2% to 8% by weight thereof, (b) from about 70% to about 50% by weight of at least one member selected from the group consisting of dicyclopentenyloxyalkyl acrylate and dicyclopentenyloxyalkyl methacrylate represented by the formula

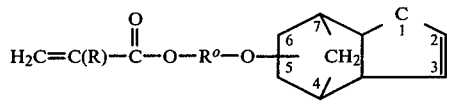

wherein R is selected from the group consisting of H and CH$_3$, and R$^o$ is selected from the group consisting of (i) a C$_2$–C$_8$ divalent alkylene group and (ii) a C$_2$–C$_8$ divalent oxyalkylene group, (c) from about 1% to about 3% by weight, based on the total amount of components (a) and (b), of at least one polyol, (d) a small but effective amount of a catalyst for the condensation reaction of the urethane prepolymer of (a) with the polyol of (c), and (e) a small but effective amount of a catalyst for the polymerization of component (b).

In another aspect the invention comprises a process for producing a laminate of films, having a thickness of from about 0.05 mm. to about 0.2 mm., of solid materials selected from the group consisting of thermoplastic films, metallic foil films, and metallic sheets, by means of forming an adhesive bond between the contiguous or mating surfaces of the solid materials comprising the steps of (a) applying to the contiguous surface of at least one of the surfaces to be bonded a layer of the adhesive composition of the invention, (b) placing the surfaces in contact with the adhesive layer between them, and (c) maintaining the contacted surfaces in stationary contact relationship until polymerization of the adhesive layer provides adequate curing to adhere the surfaces together.

The preparation of the urethane prepolymers (sometimes referred to in the art as isocyanate, or polyisocyanate, prepolymers) useful in the adhesive compositions of the invention is well known in the art. Generally, the preparation of these prepolymers involves the reaction of a hydroxyl-containing polyether or a hydroxyl-terminated polyester compound with a diisocyanate or other polyisocyanate to yield an isocyanate-terminated prepolymer product.

The polyether class of urethane prepolymers, generally, may be produced by the reaction of an organic polyisocyanate with a poly(oxypolymethylene)glycol. Representative organic diisocyanates which can be employed are arylene diisocyanates such as para-phenylene diisocyanate, diphenyl diisocyanate and the like; alkylarylene diisocyanates, such as toluene diisocyanate (TDI), 3,3'-dimethyl-4,4'-biphenylene diisocyanate and the like; alkylene diisocyanates, for example ethylene diisocyanate, 1,4-tetramethylene diisocyanate, and hexamethylene diisocyanate and the like; arylalkylene diisocyanates, such as methylene bis(-phenyl isocyanate); and alicyclic diisocyanates, for example, isophorone diisocyanate and methylcyclohexyl diisocyanate. Representative poly(oxypolymethylene) glycols contain oxypolymethylene groups in which a linear chain of from about 2 to about 6 carbon atoms separate each adjacent pair of oxygen atoms. Included, for example are poly(oxytetramethylene) glycols. Other polyether glycols, such as poly(oxypentamethylene) glycols and poly(oxyhexamethylene) glycols can be used, but are usually less desirable as a class, and are branched carbon chain compounds. It is desirable that the poly(oxypolymethylene) glycols have a molecular weight between about 100 and about 4000, although the optimum molecular weight varies with the particular system and the intended use for the product.

The polyester urethane prepolymer may be produced from an organic diisocyanate or other polyisocyanate with a polyester polyol. Representative organic diisocyanates or other polyisocyanates are the same as those described above with respect to the production of the polyether urethane prepolymers. Representative polyester polyols include those produced by reacting a polycarboxylic acid, such as adipic acid, phathalic acid or maleic acid, with a polyol, such as ethylene glycol (or with ethylene oxide), 1,4-butanediol (or tetrahydrofuran), glycerine, trimethylolpropane, hydrogenated disphenol A, and the like, as well as polymeric polyols.

An extensive description of some of the useful techniques for preparing the urethane prepolymers can be found in J. H. Saunders and K. C. Frish, Polyurethanes: Chemistry and Technology, Part II, Interscience Publishers (New York, 1964), especially on pages 8 to 49, and in various references cited by Saunders and Frish. Other preparative techniques which are known in the art can also be employed.

It is desirable that the polyether urethane prepolymer component have an available isocyanate (—NCO) content of about 2% to 8% thereof, preferably about 6% to 7% by weight. When using a polyester urethane prepolymer component, it is preferred that the prepolymer have an available isocyanate content of about 0.5% to 2% thereof.

The ester-ethers, dicyclopentenyloxyalkyl acrylate and dicyclopentenyloxyalkyl methacrylate, represented by the formula

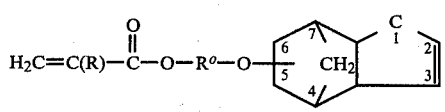

component (b) of the adhesive composition of the invention, can be produced by the procedures disclosed in Emmons and Nyi, U.S. Pat. No. 4,097,677, issued June 27, 1978 in the hands of the same assignee to which this application is assigned. The ester-ether chain may be connected to either the 5-position or the 6-position of the ring nucleus as is indicated in the structural formula. In fact, the product may comprise a mixture of the two components in one of which the ester-ether chain is substituted in the 5-position and in the other of which the ester-ether chain is substituted in the 6-position.

Preferably component (b) comprises at least one of dicyclopentenyloxyalkyl acrylate or methacrylate having the structural formula shown above wherein R is H or $CH_3$, respectively, and wherein $R^o$ is a $C_2$-$C_8$ divalent alkylene group, more preferably $R^o$ is a $C_2$-$C_6$ divalent alkylene group. Most preferably component (b) is a member selected from the group consisting of dicyclopentenyloxyethyl acrylate and dicyclopentenyloxyethyl methacrylate. It is understood that component (b) may comprise one of dicyclopentenyloxyalkyl acrylate or methacrylate, or a mixture of the respective acrylates and methacrylates, or a mixture of the respective acrylates and/or methacrylates, the various compounds comprising the mixture having varying divalent alkylene groups designated $R^o$.

As essential component (c), suitable polyols include aliphatic diols such as ethylene glycol 1,4-butane diol, diethylene glycol, hexamethylene glycol, and the like; aliphatic triols such as trimethylol methane, trimethylol propane, 1,2,6-hexane triol and the like. This component is essential for the purpose of extending the chain length of the urethane prepolymer, thereby, in effect, increasing the molecular weight of the urethane prepolymer component and increasing the viscosity of the adhesive composition so as to provide early adhesive strength (known in the art as "green strength"). The polyol, component (c), is used in an amount sufficient to give an NCO/OH ratio of from about 0.5 to 2.0, preferably from about 1.0 to about 1.5.

As component (d), there may be used a small but effective amount of any catalyst which can catalyze the condensation reaction between component (a) and (c). Suitable catalysts include one, or more, of stannous octoate, manganese octoate, cobalt octoate, and dibutyltin diacetate or dilaurate. The tin salts are preferred.

The selection of the polymerization catalyst, component (e), depends upon the type or method of polymerization to be employed. When, as a source of radiation, ultraviolet light is selected for use to polymerize the acrylate or methacrylate component of the adhesive composition, there may be used photoinitiators selected from the group consisting of acyloins or derivatives thereof, for example benzoin alkyl ethers such as benzoin methyl ether, desyl halides such as desyl bromide, benzophenone and derivatives thereof, acetylphenone compounds, polychlorinated aromatic compounds, a combination of organic carbonyls and amines or mixtures thereof. The acetylphenone photoinitiators are disclosed in U.S. Pat. No. 3,715,293; the combination of organic carbonyls and amines is disclosed in U.S. Pat. No. 3,795,807, the disclosures of which patents are hereby incorporated by reference.

When polymerization is to be effected by exposure of the adhesive composition to, as a source of radiation, electron beam radiation, it is not necessary to use any photoinitiator or polymerization catalyst at all. Methods and apparatus for producing electron beam radiation are disclosed in the following: Quintal et al., U.S. Pat. No. 3,745,396 issued July 10, 1973, and Denholm et al., U.S. Pat. No. 3,769,600 issued Oct. 30, 1973.

When polymerization of the adhesive composition is to be effected by conventional vinyl-free radicals polymerization techniques, there may be used organic peroxides or hydroperoxides derived from hydrocarbons containing from about 3 to 18 carbon atoms. For example suitable organic hydroperoxides include the following: tertiary butyl hydroperoxide, cumene hydroperoxide, methylethylketone hydroperoxide, diisopropylbenzene hydroperoxide, and the like. The organic hydroperoxides should be present in an amount of 0.1% to about 20%, preferably from about 0.5% to 10% based on the total mixture. The mixture may also contain, either alone or in combination with the organic hydroperoxides, those organic peroxides which are half decomposed after 10 hours at temperatures which are higher than 85° C. to 90° C. Suitable organic peroxides include tertiary butyl perbenzoate, 2,2-bis(tertiary-butyl peroxy)butane, bis-(1-hydroxy-cyclohexyl)peroxide, tertiary-butylperoxy-isopropyl carbonate, and the like. The organic peroxides are used in the amounts similar to those mentioned above for the organic hydroperoxides.

Suitable accelerators which may be used are, for example, aliphatic or aromatic tertiary amines, for example trialkylamines such as triethylamine and tributylamine, dialkylphenol amines such as dimethylaniline, para-dimethyltoluidine, and N,N-di(2-hydroxyethyl)-para-toluidine, and the like. The accelerators, when used, are generally added in small quantities of about 0.1 to 5% by weight of total mixture. Of course, the mixtures of the invention can be free of added stabilizers of accelerators; therefore, the mixtures of the invention can contain 0 to 0.1% of stabilizers by weight and from 0 to 5% of accelerators by weight.

Thickeners, inorganic fillers, reinforcing resins, and dyestuffs may be added to the compositions to adjust viscosity, or to modify the mechanical and/or optical properties. Suitable thickeners are polymeric compounds such as polymethyl methacrylate, polystyrene, polyvinyl chloride, synthetic rubber and the like. Suitable fillers are, for example, finely divided silicone dioxide, bentonites, calcium carbonate or titanium dioxide. Examples of resins are the polyesters, especially alkyd resins. The thickeners and/or fillers may be added in amounts of from 0 to about 20% by weight. The amount of polyester or alkyd used may be up to 50% by weight of reactive diluent monomer, that is component (b), used.

Polymerizable acids, such as beta-acryloxypropionic acid and its methacryloxy analog may be added in amounts up to about 15% by weight of component (a) to enhance the adhesive bond obtained. See Wegemund, U.S. Pat. No. 4,048,259.

Besides the optional components mentioned above, there may also be included in the adhesive composition according to the invention one or more optional components selected from the group consisting of plasticizers, pigments, dyes, and the like which are apparent to those skilled in the art.

The adhesive compositions of the present invention include single-package systems and two-package systems. That is, all of the components of the adhesive composition according to the invention can be mixed together and then the mixture can be applied to a surface of one film or solid material to be adhered to the second film or solid material and, finally, the two films or solid materials can be contacted together, the contiguous surfaces having between them the adhesive composition. Optionally, one or more of components (a), (b) and (c) can be mixed and then separated into two mixtures. For example an accelerator and a condensation catalyst can be provided in one package containing the acrylate or methacrylate component and the polymerization catalyst, when used, can be provided in the other package with the urethane prepolymer and polyol components.

Thermoplastic films which can be laminated according to the invention include polyolefin films such as polyethylene and polypropylene films, polystyrene films, and polyester films and the like. Metallic foils and/or sheets which can be used in the invention include aluminum and steel foil and sheets.

The following examples, in which the parts and percentages are by weight unless otherwise specified, are illustrative of but a few embodiments of the present invention:

EXAMPLE 1

This example illustrates the effect of polyol concentration on the adhesive property of radiation curable polyurethane adhesives containing dicyclopentenyloxyethyl acrylate as a reactive diluent.

Adhesives are made by mixing 50 g of a toluene diisocyanate/poly(1,4-oxybutylene glycol) urethane prepolymer, sold under the duPont trade name Adiprene TM L-100, with 50 g of dicyclopentenyloxyethyl acrylate, 2 g of diethoxyacetophenone and 1 g of benzophenone, both photoinitiators, 0.5 g stannous octoate catalyst for curing the polyurethane and the various amounts of 1,2,6-hexanetriol shown in Table I.

Following about two hours after mixing, the above mixtures are spread on poly(ethylene terephthalates) film (0.125 mm thick) with a wire-wound rod applicator. The thickness of the adhesive mass thus applied is about 0.0125 mm. A second piece of poly(ethylene terephthalate) is then pressed onto the adhesive mass. The laminate thus obtained is passed twice at a distance of 15 cm under two 80 W/cm medium pressure mercury vapor lamps at a speed of 3 m/min. T-peel tests are made on the laminates according to ASTM Method D1876 after conditioning for 1 day, 1 week, and 1 month.

The data in Table I show that, for high early and persistent peel strength in the range of amounts of components of the adhesive composition tested, an NCO-/OH ratio of 1.00 to 1.33 yields most advantageous peel properties.

TABLE I

| Hexanetroil | | Peel Strength (N/cm) after Conditioning | | |
|---|---|---|---|---|
| g | NCO/OH | 1 day | 1 week | 1 month |
| 2.65 | 0.83 | 1.7 | 2.0 | 1.3 |
| 2.20 | 1.00 | 4.0 | 3.4 | 5.5 |
| 1.83 | 1.20 | 4.8 | 5.3 | 5.9 |
| 1.65 | 1.33 | 5.9 | 9.4 | 9.2 |
| 1.10 | 2.00 | 11.8 | 10.6 | 1.3 |
| 0.55 | 4.00 | 10.7 | 3.7 | 1.1 |
| 0 | — | 5.7 | 1.7 | 1.5 |

EXAMPLE 2

The procedure of Example 1 is followed except a series of poly (1,4-oxybutylene glycol) urethane prepolymers having varying available NCO contents as indicated in Table II are used. Throughout this series an NCO/OH ratio of about 1.2 is employed. Corona discharge treated polypropylene and untreated polyethylene films are used in addition to the polyester film described in Example 1.

T-peel test data in Table II indicate that the prepolymers having an NCO/OH ratio of about 6.5 are preferred for high peel strength on a variety of substrates.

TABLE II

| Polytetramethyleneoxide urethane prepolymer | | Peel Strength (N/cm) | | |
|---|---|---|---|---|
| | | Polyester | Polypropylene | Polyethylene |
| Adiprene$^{TM}$ | Available NCO (%) | (0.125 mm) | (0.075 mm) | (0.125 mm) |
| *L-42 | 2.8 | 5.0 | 4.6 | 4.8 |
| *L-83 | 3.1–3.4 | 5.5 | 4.8 | 6.8 |
| *L-100 | 3.9–4.3 | 5.3 | 5.5 | 5.5 |
| *L-167 | 6.1–6.6 | 9.4 | 8.5 | 11.0 |
| *L-200 | 7.3–7.7 | 3.1 | 6.4 | 7.5 |
| *L-315 | 9.3–9.7 | 2.6 | 7.9 | 7.9 |

*All are toluene diisocyanate/poly(1,4-oxybutylene glycol) urethane prepolymers.

EXAMPLE 3

This example shows that the reactive diluent dicyclopentenyloxyethyl acrylate can be polymerized chemically as well as by radiation in urethane adhesives for film to film lamination.

An adhesive is made by mixing 33.3 g of Adiprene L-167 with 66.7 g dicyclopentenyloxyethyl acrylate, 2.1 g 1,4-butanediol, 1.0 g stannous octoate, 3.0 g cumene hydroperoxide and 0.8 g manganese octoate. Laminates are made as in Example 1 above except that propylene film is used in the place of the polyester film and that chemical-initiator free radical polymerization is employed, with the untreated polypropylene film having 0.075 mm thickness. Cure is effected under ambient conditions. T-peel tests run as above gave 2.3 N/cm strength after conditioning one day and 4.7 N/cm after one week.

EXAMPLE 4

An adhesive is made by mixing 50 g of dicyclopentenyloxyethyl methacrylate with 50 g of Adiprene L-167, 2.8 g 1,2,6-hexanetriol, 0.5 g stannous octoate, 3.0 g cumene hydroperoxide and 1.0 g cobalt octoate. This adhesive is spread as in previous examples on untreated polypropylene film and allowed to polymerize under ambient conditions. T-peel test values measure 5.9 N/cm after one day, 5.3 N/cm after two weeks and 4.5 after one month.

EXAMPLE 5

An adhesive is made by mixing 50 g of dicyclopentenyloxyethyl acrylate with 50 g of Hypol ™ FHP 3000, a polyether urethane prepolymer containing 2.35% available NCO from W. R. Grace & Co., 1.04 g of 1,2,6-hexanetriol, 0.5 g stannous octoate, 2.0 g diethoxyacetophenone and 1.0 g benzophenone.

This adhesive is applied to polypropylene film, UV cured and tested as described in Example 1.

Peel test values of 4.9 N/cm are obtained after one day's ageing and 4.5 N/cm after one month.

EXAMPLE 6

This example illustrates the use of electron beam radiation to effect polymerization of the urethane laminating adhesive.

An electron beam curing laminating adhesive is prepared by mixing 33 parts by weight of Adiprene L-200, 67 parts by weight of dicyclopentenyloxyethyl acrylate, 2.6 parts of 1,4-butanediol and 1 part of dibutyltin diacetate catalyst for the reaction between Adiprene urethane prepolymer and the diol. A stable viscosity of 7000 cps is obtained after one day at room temperature. Laminates of polyethylene terephthalate film or untreated polypropylene film are made as described in Example 1. The laminates are passed twice through a curtain of high energy electrons, receiving a dosage of 10 megarads per pass. When tested for peel adhesive, as in Example 1, a force of 4.3 N/cm is required to separate the laminates.

EXAMPLE 7

This example illustrates the use of an adhesive composition comprising a urethane polymer dissolved in dicyclopentenyloxyethyl acrylate in the lamination of aluminum siding to foil-faced thermal insulation.

The laminating adhesive is made by mixing 100 grams of dicyclopentenyloxyethyl acrylate, 10 grams of acryloxypropionic acid to promote adhesion to aluminum, 50 grams of a poly(1,4-oxybutylene glycol) urethane prepolymer, 3.4 grams 1,4-butanediol (an amount equivalent to the isocyanate in the prepolymer), and 0.55 grams dibutyltin diacetate catalyst for the reaction. This mixture is allowed to react at room temperature for several hours and then it is divided into two equal parts. One gram of N,N-di(2-hydroxyethyl)-p-toluidine was added to the first part of the mixture and 1 gram of benzoyl peroxide was added to the second part. Both parts are then mixed and quickly spread on the aluminum siding and immediately the aluminum foil is contacted with the adhesive on the siding. Within a few minutes the siding and the foil-faced insulation were firmly bonded. A peel strength of 3.0 N/cm is required to separate the laminates.

EXAMPLE 8

The procedure of Example 6 is followed except the adhesive is made by reacting 33 parts by weight of a urethane prepolymer made from polyoxytetramethylene glycol and methylene-bis(4-cyclohexyl isocyanate) (Adiprene ™ LW-570), 2.6 parts of 1,4-butanediol, and 1 part of dibutyltin diacetate in 67 parts of dicyclopentenyloxyethyl acrylate. When tested as a laminating adhesive as in Example 1, a value of 4.6 N/cm is obtained for peel strength.

EXAMPLE 9

This example illustrates the use of a polyester urethane in the present invention.

To a flask fitted with a heating mantle and a stirrer are added the following: 88.5 g of a polyester made from 1,2-propane diol and sebacic acid having a hydroxyl equivalent of 2950 g/OH, 58 g of dicyclopentenyloxyethyl acrylate, 3.9 g of toluene diisocyanate, 0.1 g of dibutyl tin dilaurate. The contents of the flask is held at 40° to 45° C. for 3 hr. with stirring; then 0.7 g of 1,4-butanediol is added and stirring at 50° C. is continued for another 3 hr. Finally an additional 49 g of dicyclopentenyloxyethyl acrylate is added and the mixture allowed to cool to room temperature.

The mixture is then divided into two 100-gram portions; 1.5 g of benzoyl peroxide are added to one portion, and 1.5 g of N,N-di(2-hydroxyethyl)-p-toluidine are added to the other portion. Equal portions by weight of each part are mixed and, as in Example 7, used to affix aluminum siding to foil-faced insulation. In about 15 minutes at room temperature the components of the laminate thus obtained are firmly adhered.

What is claimed is:

1. A spreadable laminating adhesive composition comprising, as its essential components,
    (a) from about 30% to about 50% by weight of a urethane prepolymer derived from the reaction of a member selected from the group consisting of a hydroxyl-terminated polyether and a hydroxyl-terminated polyester with an organic polyisocyanate, the urethane prepolymer having a free —NCO content of from about 2% to 8% by weight thereof,
    (b) from about 70% to about 50% by weight of at least one member selected from the group consisting of dicyclopentenyloxyalkyl acrylate and dicyclopentenyloxyalkyl methacrylate represented by the formula

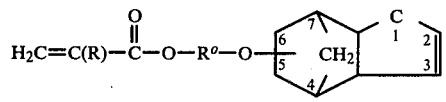

wherein R is selected from the group consisting of H and CH$_3$, and R$^o$ is selected from the group consisting of (i) a C$_2$–C$_8$ divalent alkylene group and (ii) a C$_2$–C$_8$ divalent oxyalkylene group,
    (c) from about 1% to about 3% by weight, based on the total amount of components (a) and (b), of at least one polyol,
    (d) a small but effective amount of a catalyst for the condensation reaction of the urethane prepolymer of (a) with the polyol of (c), and
    (e) a small but effective amount of a catalyst for the polymerization of component (b).

2. The composition of claim 1 wherein the urethane prepolymer is derived from the condensation reaction of a hydroxyl-terminated polyether with an organic polyisocyanate.

3. The composition of claim 1 or 2 wherein the component (b) comprises at least one member selected from the group consisting of dicyclopentenyloxyethyl acrylate and dicyclopentenyloxyethyl methacrylate.

4. The composition of claim 1 further comprising, optionally, one or more of the following additives:
   (a) a polymerization inhibitor,
   (b) an adhesion-promoting compound selected from the group consisting of β-acryloxypropionic acid and β-methacryloxypropionic acid,
   (c) a thickener,
   (d) an inorganic filler,
   (e) a reinforcing resin selected from the group consisting of polyesters, especially alkyd resins,
   (f) pigments and dyes, and
   (g) a plasticizer.

5. A process for producing a laminate of films, having a thickness of from about 0.05 mm to about 0.2 mm, of solid materials selected from the group consisting of thermoplastic films, metallic foil films, and metallic sheets by means of forming an adhesive bond between the contiguous or mating surfaces of the solid materials comprising the steps of (a) applying to the contiguous surface of at least one of the surfaces to be bonded a layer of the adhesive composition of claim 1, (b) placing the surfaces in contact with the adhesive layer between them, and (c) maintaining the contacted surfaces in stationary contact relationship until polymerization of the adhesive layer provides adequate curing to adhere the surfaces together.

6. The process of claim 5 wherein the thermoplastic films are selected from the group consisting of polyolefin and polyester films.

7. The process of claim 5 wherein the metallic foil films and metallic sheets are selected from the group consisting of aluminum and steel.

8. The process of claim 5 wherein the solid materials comprise a translucent thermoplastic film, the polymerization catalyst, component (e), of the adhesive composition comprises a photosensitive compound and wherein curing of the adhesive composition is effected by exposing the contacted thermoplastic films, having between the contiguous surfaces the adhesive composition, to a source of radiation, the radiation source being ultraviolet light radiation.

9. The process of claim 5 wherein the solid materials comprise translucent thermoplastic films and wherein curing of the adhesive composition is effected by exposing the contacted thermoplastic films, having between the contiguous surfaces the adhesive composition absent the polymerization catalyst, component (e), to electron beam radiation.

10. The process of claim 5 wherein the polymerization catalyst, component (e), of the adhesive composition comprises an organic percompound selected from the group consisting of organic hydroperoxides and organic peroxides and wherein curing of the adhesive composition is effected by exposing the contacted solid materials, having between the contiguous surfaces the adhesive composition, to ambient conditions.

11. An article produced by the process of claim 5.

* * * * *